Jan. 16, 1940.   W. F. ALDER   2,186,948
DEVICE AND METHOD TO TEST RADIATION OF HEAT FROM A BODY
Original Filed Oct. 23, 1936
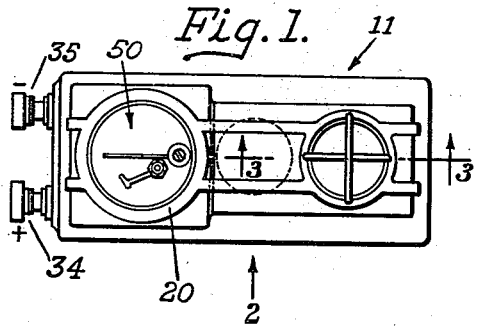
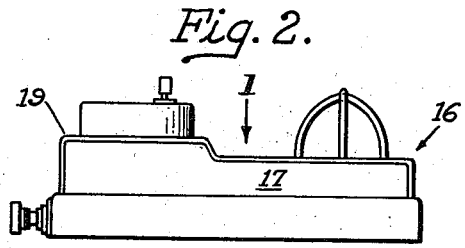
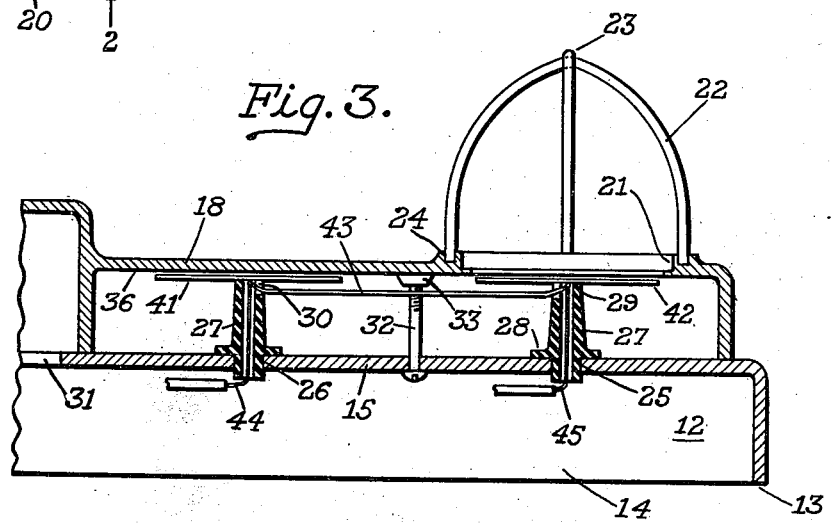
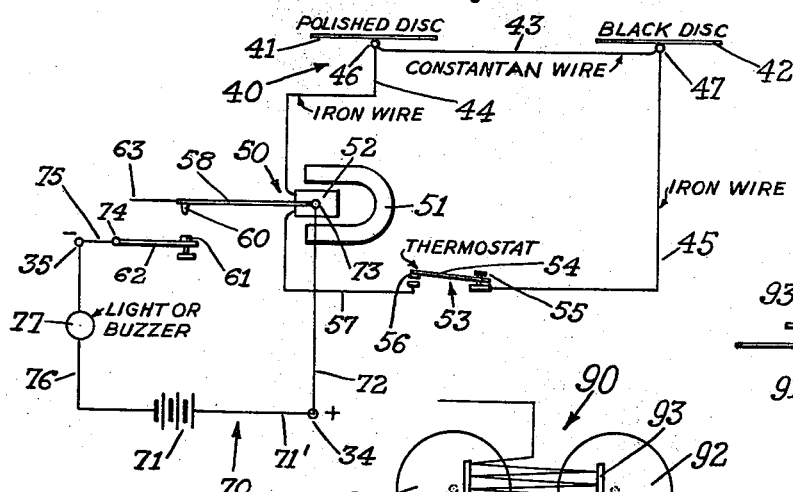
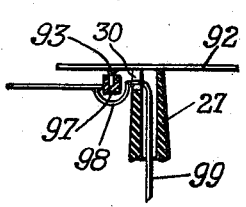
Inventor.
William F. Alder
By Hazard & Miller
Attorneys.

Patented Jan. 16, 1940

2,186,948

UNITED STATES PATENT OFFICE 2,186,948

DEVICE AND METHOD TO TEST RADIATION OF HEAT FROM A BODY

William F. Alder, Altadena, Calif., assignor to Frank E. Wood, as trustee, Monrovia, Calif.

Application October 23, 1936, Serial No. 107,171
Renewed April 17, 1939

14 Claims. (Cl. 73—51)

I designate my invention as a radiation hygrometer and method of testing radiation as it is mainly operative in indicating radiation from the surface of the earth to inter-stellar space in accordance with the aqueous vapor in the atmosphere. The device operates by using the principle of the diathermic properties of the atmosphere to radiation of heat both from and to the earth and wherein the aqueous vapor in the form of an attenuated transparent gas is stated by reliable authorities to vary between .04 and .05 percent of the earth's atmosphere, nevertheless such aqueous vapor has a pronounced effect on the rate of radiation from the surface of the earth.

Therefore one of the uses of my instrument is for indicating the rate of radiation from the earth's surface in which the amount of aqueous vapor in the air is one of the main controlling factors. A practical application of my invention is in determining a danger point as to possible damage by frost of agricultural crops such as fruits or the like, which are readily damaged by the frost. Usually the frost occurs in clear weather, that is, on occasions when there are no clouds and also at night and when there is little or no wind.

Frost occurs upon the surface of growing vegetation prior to the fall of temperature of the surrounding atmosphere to the frost point. This is due to the fact that growing vegetation is an excellent radiator of heat and in consequence thermometers located in the vicinity of growing plants and trees do not register the true temperature of the foliage of these. Because of the fact that foliage is an excellent radiator of heat, and particularly so in the absence of water vapor in the immediately surrounding atmosphere, and, due also to the fact that such foliage is a poor conductor of heat which prevents replenishment of heat lost by radiation by conduction from the main plant body itself, such foliage becomes chilled to the frost point much sooner than does the air surrounding it and frost crystals gather in the leaf cell structure sometimes one hour before a bright surface such as a non-radiating mercury thermometer bulk, will become chilled to the frost point by pure conduction due to contact with a vapor free surrounding atmosphere. In consequence of this, at an appreciable time before a thermometer so located can sound an alarm, the damage has been done and my purpose in designing this instrument is to measure the rate of radiation of heat when surrounding temperatures are approaching the danger bracket and forewarn the grower that his crop is in danger. In many cases the radiation curve and air temperature curve do not follow each other and thus the thermometer may indicate anomalous and misleading conditions. My device therefore is set in an exposed place out of doors so that there is opportunity for free radiation from and to the instrument.

In my invention I develop a thermocouple by the relative radiation of two similar metal discs, one of which has its top surface blackened and exposed directly to inter-stellar space. The other disc is highly polished to restrict radiation and has the polished surface directed towards a confining housing which also has a highly polished interior surface. Thus the black disc which is a good radiator, is open for free radiation whereas the polished disc which is a poor radiator is positioned so that its radiations are reflected back to such polished disc. Both discs are mounted in such a manner to be both influenced by heat interchange from the earth. Hence, if the temperature of the black disc decreases at a much more rapid rate under conditions of good radiation from the earth, the instrument thus establishes an indication of conditions of what might be termed such excessive radiation as to cause danger of frost.

Of course these conditions of rapid radiation may take place when the air temperature is sufficiently high that there is no danger of frost. However when the air temperature is low, that is, near the frost point, by means of a thermostat I arrange to have a circuit closed when the air temperature is sufficiently low that there is danger of frost due to the excessive over normal of radiation from the earth. This radiation by the thermocouple produces an electric current which current actuates a suitable delicate relay and the relay when actuated closes an auxiliary circuit to a signal device which may be a light or a buzzer or if desired, the auxiliary circuit may close circuits for starting the operation of heat or humidifying appliances.

The thermocouple is developed by using suitable metals connected together such as constantan wire and iron, which under conditions of differential temperature establish a current. Hence the mechanical set up includes the polished and the black disc suitably mounted as above mentioned, connected together by the constantan wire and the terminal of such wire at each disc also being connected to an iron wire. During conditions of rapid heat radiation from the earth, the temperature of the black disc lowers more rapidly than that of the polished disc and thus develops the thermo-electric current. It is found that the rate of radiation increases as the amount of aqueous vapor in the air decreases. That is, the indication given shows a variation of the radiation in an inverse ratio to the aqueous vapor in the air. Of course while heat is being radiated from the black disc such black disc is also receiving heat radiated back to the earth from the aqueous vapor and dust particles in the air and also from clouds passing between the disc and inter-stellar space. Therefore when a considerable amount of heat is being radiated from the earth's atmosphere to the earth, the indication of the radiation from the earth decreases. However, during conditions of a cloud blanket over the surface of the earth, there is very little danger in most fruit growing or delicate vegetable growing districts of frost. However, when the air temperature is low and the atmosphere is clear, coupled with the low air temperature and excessive radiation, there is danger of frost and by my instrument indications are given of this danger before the air temperature is fallen sufficiently low to cause damage, thus giving ample warning to agriculturists for protection of their crops, which is usually done by artificial heating or other manner.

Although it is known that the ozone in the upper atmosphere has a marked effect on the radiation from the earth, that is, when the amount of ozone increases the radiation is decreased, nevertheless at night apparently the ozone produced from the oxygen in the air by the action of sunlight, reverts to an oxygen which does not absorb or reflect back the heat rays to such an extent as the ozone.

In one form of my invention I may use a thermopile made by a grid of for instance iron and constantan wires thermally connected to the polished and the black disc but not electrically connected to these. This makes an instrument possibly more sensitive than the one having the thermocouple.

My invention is illustrated in connection with the accompanying drawing, in which:

Fig. 1 is a plan of the instrument assembly taken in the direction of the arrow 1 of Fig. 2.

Fig. 2 is a side elevation taken in the direction of the arrow 2 of Fig. 1.

Fig. 3 is a partial longitudinal section on the line 3—3 of Fig. 1 taken in the direction of the arrows.

Fig. 4 is an electrical wiring diagram indicating the signal actuated through the relay.

Fig. 5 is a diagram of a thermopile connected to the underside of the black and the polished discs.

Fig. 6 is a vertical section showing the connection of the thermopile to one of the discs.

Referring to the construction assembly of Figs. 1, 2, and 3, I employ a suitable housing 11 which is preferably made of aluminum, which has lower side walls 12, the lower edge 13 of which is adapted to rest on a suitable stand and preferably open at the bottom 14. A horizontal partition 15 connects the side walls and is in effect the top of the lower part of the structure. A cover housing 16 has side walls 17 and a top 18, there being an elevated end portion 19 with an opening 20. There is also a radiation opening 21 in the top portion 18 and over this is a cover guard 22 shown as formed by arched wires intersecting at 23 and having their lower ends fitted in recesses 24. The partition is provided with two openings 25 and 26 for the reception of electrically insulating bushings 27. Each of these bushings is tubular and has a flange 28 resting on the partition 15 and has a transverse upper end 29 with a notch 30 cut in one side. There is also an opening 31 in the partition below the raised portion 19. The top or cover portion is secured to the base by screws 32 extending upwardly through the partition 15 and threaded into bosses 33 in the top 18. There are two terminals 34 and 35 in the end at the lower wall section 12, each of these having an insulating bushing. The housing is preferably made of aluminum and is highly polished on the under side 36 of the cover 18 above one of the bushings 27.

The thermocouple assembly designated by the assembly numeral 40 includes a polished disc 41, a black surface disc 42, a strip of one type of wire 43 which is preferably constantan wire, complementary strips of iron wire 44 and 45, each of which is connected to the constantan wire at 46 and 47 in a suitable manner to form a thermocouple. This may be done by twisting the wires together and soldering them or by spot welding them. In addition the complementary iron and constantan wires are attached preferably by solder to the underside of each of the discs 41 and 42. The same solder used to attach the constantan and iron wires together may be used to attach these assembled wires to the underside of each of the discs. The discs are identical as far as possible in construction. They are preferably silver discs of .001 inch in thickness. The disc 41 is highly polished on its upper surface whereas the disc 42 has a black upper surface to provide a good surface for radiation. Both discs are preferably similarly polished on their undersurface to restrict radiation from such undersurface.

The thermocouple construction is assembled in the housing structure 11 by having each of the discs supported on its bushing 27. This is preferably done by a suitable cement which binds or attaches the underside of the disc to the upper transverse end 29 of the bushing. The constantan wire 43 connecting the two discs extends through the notches 30 and underneath the top 18 of the housing, being maintained out of contact therewith. There is a clearance space between the disc 42 and the opening 21. This disc thus has its upper black surface exposed through the opening whereas the polished disc 41 has its upper surface facing the highly polished undersurface 36 of the top 18. The iron wires 44 and 45 extend downwardly through the bushing 27 and by being stretched tight form an additional means for securing the discs to the bushings.

The electric connections of the thermocouple assembly include a circuit closing relay 50. This may be of a type well known in the art and is illustrated in the diagram as having a permanent magnet 51, a coil 52 to be energized by the current passing through the circuit of the iron wire 44, the constantan wire 43 and an adjusting thermostat 53. This thermostat is formed of a bi-metallic strip 54 suitably mounted and having an adjusting device 55 so that the contacts 56 close at a predetermined temperature. A lead wire 57 connects to the opposite side of the coil 52 to the connection made by the wire 44. An armature 58 is actuated by the coil on its energizing and movable to register its contact 60 with an adjustable contact 61 on a conducting arm 62. In addition a pointer 63 operates over a scale if desired. Such scale may be graduated in millivolts.

The external circuit designated by the assembly numeral 70 includes a battery 71 or preferably direct current power. This has a lead 71' connecting for instance, to the terminal 34. This is indicated as being the positive side and from this there is a lead 72 to the connection 73 of the armature 58. The conducting arm 62 is preferably pivoted at 74 and from this there is an internal lead 75 connecting to the terminal 35 which is shown as being the negative connection. The connecting lead 76 from the terminal 35 to the battery includes a signal device 77 which may be an illuminating light, a buzzer or other means for giving a signal.

The manner of operation and functioning of my invention is substantially as follows: Presuming it is desired to make a test of the radiation of heat from the earth to obtain an indication of the danger of frost, the instrument is placed out of doors in an exposed location where it is not covered by foliage and so that the black plate will have a clear exposure to the sky and not be subject to heat reflected from neighboring objects. The housing may be placed directly on the ground or on a specially prepared slab of material on the ground so that both the polished and the black disc will receive substantially the same amount of heat by conduction, convection and also by heat radiated upwardly through the bottom of the housing. The insulating supports for the discs however, are intended to reduce the conduction of heat to the discs. The thermostat 34 is set to close the contacts 56 at a predetermined temperature, say possibly 35 or 40 degrees, or at a lower temperature, depending on the sensitivity of the agricultural crop to frost. Both discs radiate heat but manifestly the black disc radiates heat at a higher rate than the polished disc. Moreover the polished undersurface of the housing above the polished disc reflects the heat back to such polished disc. Therefore as the black disc exposed to space radiates heat faster than the polished disc, it cools more rapidly, that is, there is a positive change of temperature between the two discs, the blackened disc having the lower temperature. Of course the black disc receives heat radiated from the atmosphere back to the earth but when the test is made during the night, it is not subject to the direct radiation of sun heat. As above mentioned, the rate of radiation increases with a clear atmosphere involving usually a decrease in the water vapor content of the air, hence the more rapid the radiation from the black disc, the more quickly there is a difference of temperature developed between the polished and the black disc. Hence in a comparatively short time a sufficient temperature difference is developed to establish an electric current due to the thermocouple action between the constantan and the iron wires. Such action causes the operation of the relay giving a movement of the armature 58 towards the contact 61, bringing the contacts 60 and 61 into engagement when there is a sufficient flow of current to indicate the danger point in radiation of heat from the earth. Under these conditions the secondary circuit designated by the assembly numeral 70 is established, this having its own source of power and causes the energizing of the signal device 77, which as above mentioned, may be a light, a buzzer or any other suitable device, or in fact the exterior circuit could be used to actuate a second relay and by current through this second relay govern devices for igniting orchard or other heaters.

It will thus be seen that my device for indicating the rate of radiation of heat from the earth may be used to give a warning of a rate of radiation which if maintained would result in damaging frost and it gives this indication before the air temperature has been reduced to such an extent as to indicate frost damage to agricultural crops. It will be seen that my invention not only involves the instrument for detecting radiation of heat but also in the method of determining such heat radiation from the earth. It is obvious that the instrument may be used for other purposes and for instance, may have a use in determining the heat radiation from various bodies such as the heat disseminated from buildings by radiation through the walls of the building or for many other similar purposes in which comparative tests may be made of the heat radiation from different materials.

A characteristic of my invention is that I form two identical thermopiles or thermocouples at the polished disc 41 and at the radiating black faced disc 42, each of these couples being formed by the constantan wire and the iron wires connected together to the discs in identical relationship. As the constantan wire connects the two discs, these two identical thermocouples are joined in series in opposition to each other. Therefore when both of the discs are at the same temperature and this temperature is maintained or if they change in temperature equally, the current through the opposed thermocouples being in opposite directions, equalize each other. However, when the instrument is placed in an exposed position so that there is free radiation from the radiating discs 42 with the black exposed radiating face, this disc loses heat more rapidly than the polished disc 41 and hence in the opposed thermocouples produces a current for operating the electro-mechanical relay 50 which as above mentioned, may be also an indicating device. Therefore the instrument in effect operates as a thermocouple assembly operative to produce current due to the differential temperatures of the two discs and this is due to the differential rate of heat radiation.

In Figs. 5 and 6 I show an arrangement for using a thermopile assembly with the discs, this being designated by the assembly numeral 90. In this I employ the same type of discs such as the polished disc 91 and the black disc 92. Each of these discs may be supported on an insulating bushing such as 27 having a cut out notch 30. Such disc may be supported as shown in Fig. 3. A thin silver strip 93 is soldered to the underside of each disc and forms a thermal support for the grid wires 94 forming the thermopile. These wires are arranged alternately as being for instance an iron wire 95, constantan wire 96. The ends of the two opposite types of wire are connected together by soldering or the like and are supported by an electrically insulating attachment 97 to the silver strip. This is preferably a form of Celluloid or the like which gives good heat conduction from the metal disc through the silver strip to the connected ends of the complementary wires. From the ends of the thermopile electric leads 98 are carried through the notches 30 of the bushings 27 and have a connection 99 in a circuit similar to that shown in Fig. 4. In this construction it is to be noted that there is no electrical connection of the wires to the disc even although such discs are electrically insulated by the bushings 27 from the rest of the instrument.

Various changes may be made in the details of the construction without departing from the spirit or scope of the invention as defined by the appended claims.

I claim:

1. In a device as described, a supporting structure having two substantially similar radiating elements as to area of exposed surface and mass, means to mount said elements whereby one element is located for a substantial radiation and the other is located for a restricted heat radiation, means to develop a thermo-electric current between the two elements due to the differences of temperature produced by the different rates of heat radiation and an electro-magnetic means to indicate a rate of radiation from the exposed element compared with the radiation from the restricted element.

2. In a device as described, a housing and supporting structure having two substantially similar heat radiating elements mounted therein as to size of heat radiating surfaces and mass, means to expose a radiating face of the first element for substantially free radiation, the exposed face being blackened to facilitate radiation, the second element having a similar face polished to restrict radiation, the housing being located relative to the face of the second element to reflect radiation back to said element, the other radiating faces of the two elements being associated with the housing to reflect heat back to said elements, means to develop a thermo-electric current between the two elements, an electro-mechanical means to indicate the relative heat radiation from the two elements due to their differential of temperatures.

3. In a device as described and claimed in claim 2, the means to form the thermo-couple comprising a metallic connection from one point on one element to a similar point on the other element by a metal having a first characteristic of a thermo-couple and second metallic connections coupled to the first metallic connection at each of the radiating elements at the same point, the second metallic connections having a second characteristic of the thermo-electric couple.

4. In a device as described, the combination of a housing and supporting structure having a first and a second heat radiating disc mounted therein in a similar manner, the discs being electrically insulated from the housing, the two discs being similar as to size and shape of exposed radiating surfaces and similar as to mass, the said housing structure having an opening forming an exposure for the heat radiating face of the first disc, the housing having a cover over the heat radiating surface of the second disc, said cover having a characteristic of reflecting heat back to the second disc, the heat radiating surface of the first disc being characterized as a good heat radiator and the similar surface of the second disc being characterized as a poor heat radiator, a first connection of a thermo-electric couple connecting both of the discs and being connected thereto at a similar point, second connectors of the thermo-electric couple attached to the first connection at the same points on the discs, a mechanical electrical indicating instrument in circuit with the second connectors of the thermo-electric couple to indicate a relative rate of radiation from the two discs due to their temperature differential.

5. In a device as described, the combination of a first and a second disc, each disc being exceedingly thin compared with its diameter whereby the radiation of heat from the peripheral edge of the discs may be considered negligible or in any case, will be equal, the first disc having an upper surface for exposure forming a good heat radiator such as by having such upper surface blackened with a good radiating coating, the second disc having its upper surface a poor radiator such as being highly polished, the under surfaces of both discs being similar as to heat radiating characteristics, both discs being mounted on similar supporting structures which are non-electrical conductors and poor heat conductors, two identical thermo-couples, each connected in a similar manner to a disc, the thermocouples being connected for opposed operation.

6. In a device as described and claimed in claim 5, each disc being formed of a good heat conducting material and each thermo-couple having constantan wire and iron wire connected together at a disc, the constantan wire being common to both discs.

7. In a device as described and claimed in claim 5, the two discs being mounted in a housing, such housing having an opening through which the first disc has its blackened radiating surface exposed for free radiation, the housing having a cover over the second disc, such cover being highly polished to reflect heat radiated from the second disc back to such second disc.

8. In a device as described and claimed in claim 5, the thermo-couple circuit having an adjustable thermostat therein to form a closed circuit only when the thermostat is exposed at a desired range of temperatures.

9. In a device as described and claimed in claim 5, an electro-mechanical relay connected to the opposed thermo-couples and a thermostat in the thermo-couple circuit operative to form a closed circuit when the thermostat and the discs are subject to a specific predetermined range of temperatures.

10. In a device as described, comprising in combination, two heat radiating elements, means to reflect radiation from one element back onto itself, means to develop a thermo-electric current due to the difference in temperature between the two elements, and means to indicate by the electric current developed a differential radiation between the elements.

11. The method of determining the diathermic properties of the atmosphere comprising subjecting two radiating surfaces of the same size and characteristics except for differences of their radiating properties to like conditions of exchange of heat with neighboring objects, reflecting heat radiated from the poorer radiating surface back to said surface while permitting unobstructed radiation from the surface having the better radiating properties and measuring the temperature difference between said surfaces as an index of the diathermic properties of the atmosphere.

12. A method of determining radiation characteristics apt to cause frost damage to foliage in a zone approximating freezing atmospheric temperatures comprising submitting two substantially equal bodies to the same conditions of absorptions of heat, permitting one body to have substantially free radiation in at least one direction equivalent to the free radiation of the foliage, restricting the free radiation of the other body in the same direction, measuring a differential temperature between the two bodies as an index of conditions of rapid radiation from the foliage which if continued would probably cause damage to the foliage by frost.

13. A method of determining heat characteristics comprising submitting two substantially equal bodies to the same conditions of absorption of heat, permitting one body to have substantially free radiation in at least one direction and restricting the radiation of the other body in the same direction, and measuring the differential temperatures between the two bodies as an index for determining heat characteristics.

14. The method of determining the diathermic properties of the atmosphere comprising subjecting two similar bodies to the same conditions of absorption of heat, restricting the radiation of heat to the atmosphere from a first body, permitting the second body to have free radiation of heat to the atmosphere, and measuring the temperature difference beween said bodies due to the loss of heat from the second body relative to the first body as an index of the diathermic properties of the atmosphere.

WILLIAM F. ALDER.